(12) United States Patent
Endean

(10) Patent No.: US 11,796,318 B2
(45) Date of Patent: Oct. 24, 2023

(54) ROTATION MEASUREMENT SYSTEM USING CORIOLIS AND EULER FORCES

(71) Applicant: Honeywell International Inc., Charlotte, NC (US)

(72) Inventor: Daniel Endean, Plymouth, MN (US)

(73) Assignee: Honeywell International Inc., Charlotte, NC (US)

( * ) Notice: Subject to any disclaimer, the term of this patent is extended or adjusted under 35 U.S.C. 154(b) by 248 days.

(21) Appl. No.: 17/405,476

(22) Filed: Aug. 18, 2021

(65) Prior Publication Data

US 2023/0057613 A1     Feb. 23, 2023

(51) Int. Cl.
*G01C 21/18* (2006.01)
*G01C 19/5705* (2012.01)

(52) U.S. Cl.
CPC ......... *G01C 19/5705* (2013.01); *G01C 21/18* (2013.01)

(58) Field of Classification Search
CPC .............................. G01C 19/5705; G01C 21/18
See application file for complete search history.

(56) References Cited

U.S. PATENT DOCUMENTS

| | | | |
|---|---|---|---|
| 6,978,673 B2 | 12/2005 | Johnson et al. | |
| 7,036,373 B2 | 5/2006 | Johnson et al. | |
| 7,526,957 B2 | 5/2009 | Watson | |
| 8,250,921 B2 | 8/2012 | Nasiri et al. | |
| 8,991,247 B2 | 3/2015 | Trusov et al. | |
| 9,164,119 B2 | 10/2015 | Yamamoto | |
| 9,983,003 B2 | 5/2018 | Ichimaru | |
| 10,330,476 B2 | 6/2019 | Shao | |
| 2020/0263990 A1 | 8/2020 | Kuisma et al. | |
| 2020/0292313 A1 | 9/2020 | Endean | |

FOREIGN PATENT DOCUMENTS

EP     1832841 A1     9/2007

OTHER PUBLICATIONS

European Patent Office, "Partial European Search Report", from EP Application No. 22188707.8, from Foreign Counterpart to U.S. Appl. No. 17/405,476, filed Jan. 20, 2023, pp. 1 through 14, Published: EP.

Verma, "Analytical Modeling of Discrimination Scheme for Detection of Angular Rate and Acceleration for a 4-DOF MEMS Gyro-Accelerometer", Information Technology and Nanotechnology (ITNT-2016), Collection of Selected Papers of the II International Conference on Information Technology and Nanotechnology, vol. 1638, Jan. 1, 2016, pp. 700 through 708.

European Patent Office, "Extended European Search Report", from EP Application No. 22188707.8, from Foreign Counterpart to U.S. Appl. No. 17/405,476, filed Apr. 25, 2023, pp. 1 through 12, Published: EP.

*Primary Examiner* — Mathew Franklin Gordon
(74) *Attorney, Agent, or Firm* — Fogg & Powers LLC

(57) ABSTRACT

A rotation measurement system that includes at least two proof masses and at least one pick-off is provided. Each proof mass is driven in a first axis of motion. The at least one pick-off is configured to measure movement of the at least two proof masses in a second axis when the system is rotated about a rotation point and generate Coriolis signals and Euler signals based on the measured movement of the at least two proof masses.

20 Claims, 9 Drawing Sheets

ROTATION MEASUREMENT SYSTEM USING CORIOLIS AND EULER FORCES

BACKGROUND

The measurement of rotation (angular velocity and angular acceleration) using inertial sensors is critical for several classes of applications. The first class relates to the determination of the position, orientation, and motion of an object. Examples include inertial navigation of a vehicle (the object's position) as well as gyro-compassing and up-finding (the object's orientation). The second class relates to the control of motion of an object through feedback mechanisms. An example includes the use of inertial sensor in combination with control surfaces of a flying vehicle to maintain a trajectory or execute a maneuver. Other example systems that must be controlled to maintain a constant orientation and smoothly move between orientations include platforms such as oil rigs, camera mounts and telescopes. These different applications need rotational sensors with different bandwidth sensitivity.

To navigate an object or determine its orientation, a rotational sensor must have very accurate measurements of rotation at long time scales. Most vehicles take seconds or longer to execute rotations, so the sensor does not have to measure rapid changes in rotation rate, but it must measure the rotation very accurately. On the other end of the spectrum, however, control applications require rapid feedback between the control (steering wheel, aileron, fin, rudder) and the sensor so that the movements of the vehicle can be controlled precisely. Similarly, if the control system is attempting to eliminate vibrations, a sensor must be able to measure high frequency angular vibrations.

An issue with existing sensors is the inability to measure a wide bandwidth of rotational signals using an inexpensive, small sensor. Current methods of measuring high frequency rotation measurements generally break down into four categories. The highest performing sensors are magneto hydrodynamic (MHD) sensors which sense the motion of a magnetic fluid. MHD sensors are costly and large with limits to their precision, linearity and stability. Fiber optic gyros also compete in the highest cost, best performing markets. At the cheapest, smallest end of the market are microelectromechanical systems (MEMS). The remainder of the market is occupied by Coriolis force measuring vibratory gyroscopes. These Coriolis gyroscopes, however, have significant bandwidth/noise trade-off limitations.

SUMMARY OF INVENTION

The following summary is made by way of example and not by way of limitation. It is merely provided to aid the reader in understanding some of the aspects of the subject matter described. Embodiments provide a cost effective and efficient rotation measurement system that simultaneously measures both Coriolis and Euler forces to provide a wide bandwidth rotation measurement system.

In one embodiment, a rotation measurement system that includes at least two proof masses and at least one pick-off is provided. Each proof mass is driven in a first axis of motion. The at least one pick-off is configured to measure movement of the at least two proof masses in a second axis when the system is rotated about a rotation point and generate Coriolis signals and Euler signals based on the measured movement of the at least two proof masses.

In another embodiment, another rotation measurement system is provided that includes, a plurality of poof masses, at least one pair of pick-offs for each proof mass, a Coriolis and Euler force measuring system, a low pass filter, a demodulation circuit and a controller. Each pair of pick-offs are configured to measure movement of an associated proof mass due to Coriolis and Euler forces generated when the Coriolis and Euler force measuring system that includes the plurality of proof masses rotates about a rotation point, the Coriolis and Euler force measuring system configured to generate Coriolis signals and Euler signals based on measured movements of the plurality of proof masses. The low pass filter is configured to filter the Euler signals to generate Euler data that is proportional to angular acceleration. The demodulation circuit is configured to demodulate the Coriolis signals at a resonant frequency to generate Coriolis data that is proportional to angular velocity. The controller is in communication with the low pass filter and the demodulation circuit. The controller is configured to process the Euler data that is proportional to angular acceleration and the Coriolis data that is proportional to angular velocity to generate a rotation measurement.

In still another embodiment, a method for measuring rotation using Coriolis and Euler forces is provided. The method includes measuring movement of a plurality of proof masses moving due to the Coriolis forces and Euler forces generated by rotation of a rotation measurement system including the plurality of proof masses with a pair of pick-offs associated with each proof mass; determining Euler signals and Coriolis signals based on the measured movement of the plurality of proof masses in relation to a rotation measurement system including the plurality of proof masses; filtering the Euler signal with a low-pass filter to generate Euler data that is proportional to angular acceleration; demodulating the Coriolis signals at a resonant frequency to generate Coriolis data that is proportional to angular velocity; and processing the Euler data and the Coriolis data to determine a rotation measurement.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

An ideal sensor would have constant sensitivity independent of frequency. By combining Coriolis and Euler measurements, embodiments extend the range over which the sensitivity is nearly constant. Low frequency rotation all the way down to constant rate ("DC") rotations are of significant importance primary to navigation algorithms. To navigate, the amount that a vehicle has turned left vs right needs to be added up to know where the vehicle is heading (and similar more complex integrals to figure out position and velocity). The high frequency signals are much more important to control and stabilization algorithms. For example, if a camera platform on a helicopter needs to be stabilized, the vibrations of the helicopter need to be measured so that a servo in the camera platform can correct them and keep the camera pointing steadily at a desired target. Also, in navigating a drone or the like, there is a need for fast feedback on the motions made to steer the vehicle so that correctional movements by fins/rudder/propellers of the vehicle can be made in real-time to accomplish desired maneuvers.

Embodiments use a single rotation measurement system that simultaneously measures both high frequency and low frequency movements therein replacing the need for two separate sensors resulting in significant cost, size and weight reductions as well as providing power advantages over traditional two device systems. Embodiments may combine the functions of a classic Coriolis gyroscope that is good at measuring a rotational rate even when the rate is constant and an angular rate sensor, such as a magneto hydrodynamic sensor, that is better at measuring angular acceleration.

Figure 7:
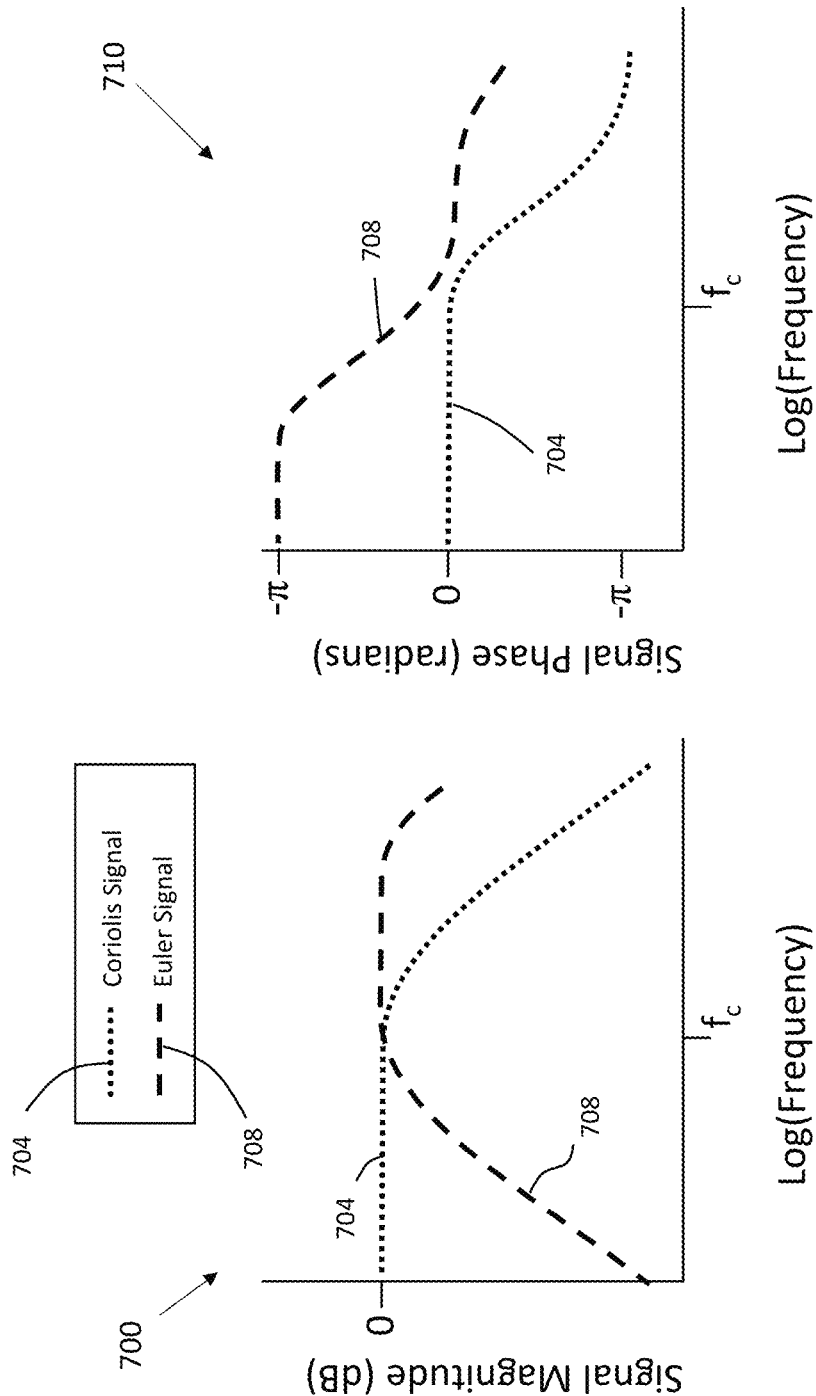
FIG. 7A illustrates a signal magnitude verses log graph according to one exemplary embodiment.
FIG. 7B illustrates a signal phase verse log graph according to one exemplary embodiment.

Referring to FIGS. 7A and 7B, bode plots 700 and 710 that illustrate a gain and phase response for a given frequency is provided. The plots 700 and 710 include a Coriolis signal 704 which would typically come from a gyroscope and a Euler signal 708 which would typically come from an angular rate sensor. The overlapping nature of the Coriolis and Euler signals in the frequency plot 700 of FIG. 7A, illustrates the complimentary benefits of a system that can accurately sense both Coriolis and Euler forces. The phase plot 710 of FIG. 7B illustrates the benefit of measuring both Coriolis and Euler forces as matter of timing. If there is a large phase shift at a given frequency, which can be thought of as a time delay, the measurement of the rotation signal lags what is happening to the vehicle. A long delay is bad for a control system because it is difficult to execute fast, complex maneuvers or hold a camera steady if there is a delay between the motion and the measurement reported by the sensor. By measuring both the Coriolis and Euler force, effects of large phase shifts are mitigated.

Figure 1:
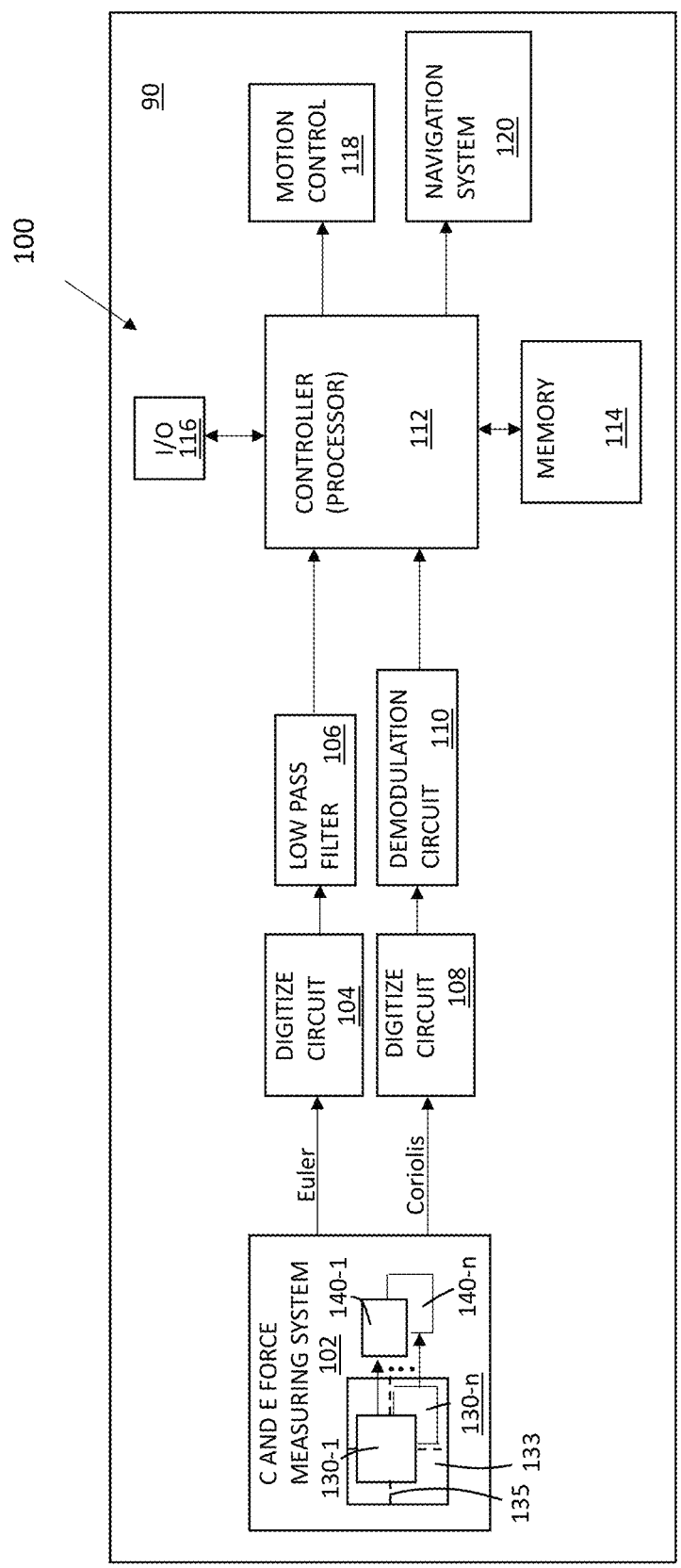
FIG. 1 illustrates a block diagram of a rotation measurement system according to one exemplary embodiment.

FIG. 1 illustrates a block diagram example of rotation measurement system 100 of one embodiment. The rotational measurement may be contained in a vehicle 90 of other type of device needing rotational measurement. The rotation measurement system 100 of FIG. 1 includes a Coriolis force and Euler force measuring system 102. Examples of Coriolis force and Euler force measuring systems are provided below in detail. The Coriolis force and Euler force measuring system 102 generates Euler signals and Coriolis signals. The generated Euler force signal, in this example, is communicated to a digitize circuit 104. Digitize circuit 104 digitizes the Euler signal that is output from the Coriolis force and Euler force measuring system 102. The generated Coriolis signal is also communicated to a digitize circuit 108 in this example. Digitize circuit 108 digitizes the Coriolis force signals output from the Coriolis force and Euler force generating system 102.

Digitized Euler signals from digitize circuit 104 are communicated to a low pass filter 106 that filters the digitized Euler signals to generate Euler data that is proportion to angular acceleration. The Euler data is communicated to a controller (112). Digitized Coriolis signals from digitize circuit 104 are communicated to a demodulation circuit 110. The demodulation circuit 110 demodulates the digitized Coriolis signals to generate Coriolis data that is proportional to angular velocity. The Coriolis data is also communicated to the controller (112). The controller 112 is configured to process both the Euler data and the Coriolis data in determining a rotation measurement based on instructions stored in memory 114.

Information determined by the controller 112 with the Euler data and the Coriolis data may be provided to a motion control system 118. The motion control system 118 may use, at least in part, the information determined by the controller 112 with the Euler and Coriolis data to control vehicle elements that control the motion or direction of a vehicle or a device. For example, the motion control system 118 may be used to maintain a constant orientation of a device, such as a camera, in relation to target as a vehicle that includes the camera traverses along a travel path. Other platform applications include, but is not limited, to oil rings and telescopes as well as other commercial and military applications. The motion control system 118 may further be used in determining if a desired turn of a vehicle, such as a turn of a drone, was successful and provide fine tuning corrections needed to complete the desired turn.

Further, information determined by the controller 112 with the use of the Euler and Coriolis data may be provided to a navigation system. The navigation system 120 may use the information to, at least in part, control navigation of a vehicle. The rotation measurement system 100 may further include an input/output that is designed to allow an operator to communicate with the controller 112 and controller 112 to communicate with the operator. For example, an input/ output 116 may include a display used to convey determined rotation measurement information to the operator as well as provide a communication path for operating instructions provided by the operator that may be stored in the memory 114 and implemented by the controller 112. The input/output 116 in an embodiment may further include the components used to manipulate one or more of a steering wheel, aileron, fin, rudder etc. in controlling the vehicle based on directions provided by the controller 112 based on one or more of the Euler data, Coriolis data, information from the motion control system 118 and the navigation system 120 and instructions stored in the memory 114.

In general, the controller 112 may include any one or more of a processor, microprocessor, a digital signal processor (DSP), an application specific integrated circuit (ASIC), a field program gate array (FPGA), or equivalent discrete or integrated logic circuitry. In some example embodiments, controller 112 may include multiple components, such as any combination of one or more microprocessors, one or more controllers, one or more DSPs, one or more ASICs, one or more FPGAs, as well as other discrete or integrated logic circuitry. The functions attributed to the controller 112 herein may be embodied as software, firmware, hardware or any combination thereof. The controller 112 may be part of a system controller or a component controller. The memory 114 may include computer-readable operating instructions that, when executed by the controller 112 provides functions of the rotation measurement system 100. Such functions may include the functions of measuring rotations based on both Coriolis and Euler data. The computer readable instructions may be encoded within the memory 114. Memory 114 is an appropriate non-transitory storage medium or media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

The Coriolis force and Euler force measuring system 102 in the example of FIG. 1 is further illustrated as including a plurality of proof masses 130-1 through 130-n and associated pick-off sensors 140-1 through 140-n. The pick-off sensors 140-1 through 140-n measure the motion of the proof masses 130-1 through 130-n relative to the body frame 133 and system 102 of the vehicle 90. The proof masses (which may be generally indicated by 130) are approximately free to move in an inertial frame of reference of the world. It is only approximately free to move because a suspension medium 135 is needed to attach the proof masses 130 to the vehicle 90. The associated pick-off sensors (which may be generally indicated by 140) measures Coriolis and Euler forces caused by movement of the proof masses 130 in relation to a vehicle frame 133 of the vehicle 90. In a MEMS sensor example, a proof mass 130 may be suspended in a cavity formed in a silicon-on-insulator wafer with the suspension medium 135. Examples of suspension medium 135 are tethers or springs, but other types of suspension medium 135 may be used.

Figure 2:
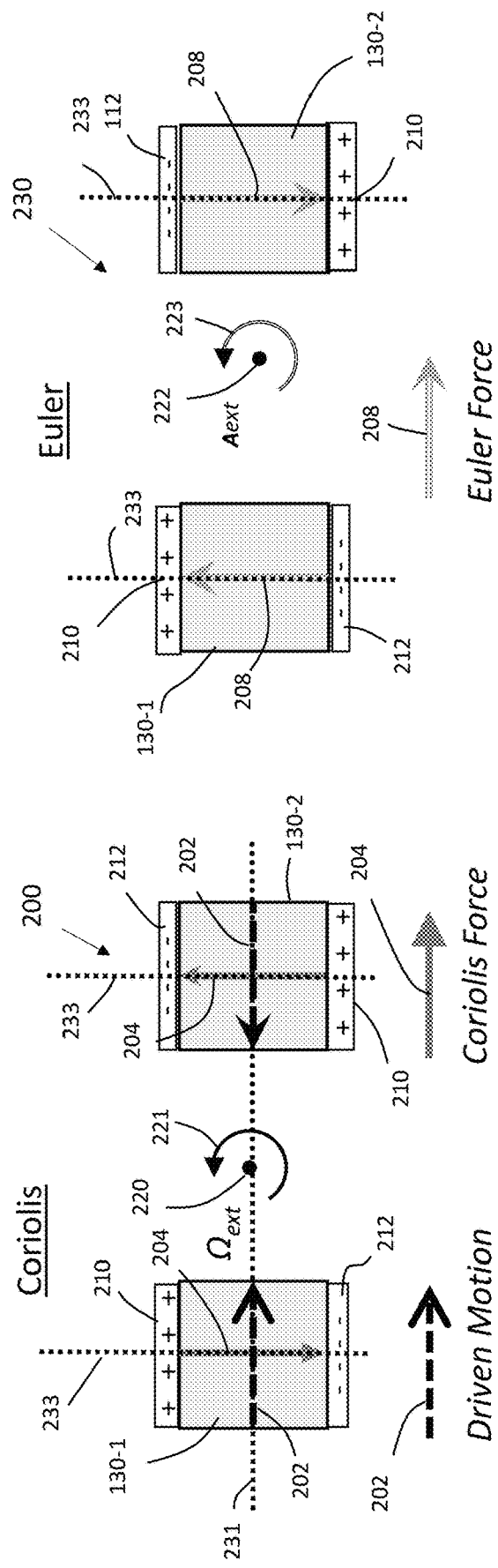
FIG. 2A illustrates an arrangement with two proof masses that generate Coriolis forces according to one exemplary embodiment.
FIG. 2B illustrates an arrangement with two proof masses that generate Euler forces according to one exemplary embodiment.

An example of a force sensor 140, known in the art, that may be used to detect force with a proof mass 130 includes a differential capacitive displacement sensor 140. This type of sensor may use capacitive plate pick-offs (or pick-offs) in detecting displacement of the proof mass relative to the frame—or reference. Examples of pick-offs 210 and 212 are illustrated in FIGS. 2A and 2B discussed below. Various configurations of the capacitive pick-offs may be used. As known in the art, with a capacitive displacement sensor, an acceleration or force applied along a sensitive axis causes the proof of mass to deflect, causing a distance (e.g., a capacitive gap between the capacitive pick-offs) to vary. This variance in the capacitive gap causes a change in capacitance in the capacitive displacement sensor which is representative of the displacement of the proof mass along the sensitive axis. The change in capacitance may be indicated by a current (signal) from a current generating circuit in the associated force sensor. Other types of pick-off sensors may be used to measure the displacement of the proof masses 130. The other types of pick-off sensors 140 include, but are not limited to, piezoelectric, piezoresistive, optical, magnetic, etc.

FIGS. 2A and 2B provide an illustration of poof masses 130 that may be used to generate a Coriolis force 204 and a Euler force 208 in a simple two proof mass arrangement. In particular, FIG. 2A illustrates a Coriolis force generating arrangement 200 and FIG. 2B illustrates a Euler force generating arrangement 230. The Coriolis force generating arrangement 200, in this simple example, uses two proof masses 130-1 and 130-2. As discussed above, a proof mass 130 is suspended to allow the proof mass 130 to move relative to a body frame 133 of a vehicle 90 of FIG. 1. Regarding a Coriolis force generating arrangement 200, pick-offs 210 and 212 are positioned in relation to their associated proof masses 130-1 and 130-2 to measure generated Coriolis forces. A Coriolis force is created when associated proof masses 130-1 and 130-2 move towards and away from each other (i.e., when the proof masses 130-1 and 130-2 are vibrating in a first driven axis 231 of motion) as the proof masses 130-1 and 130-2 rotate about a rotation point 220. A Coriolis force 204 is a result of a rotation rate and a velocity (a driven motion 202). The Coriolis force 204 is found by taking a cross product of the rotation rate and a velocity (a driven motion 202). Hence, as illustrated in FIG. 2A, the Coriolis force 204 is in a third direction (in a second axis 233). In a case where the proof masses 130-1 and 130-2 are rotating in a constant rate about rotation point 220, the cross product of the rotation rate and driven motion 202 resulting in the creation of the Coriolis force 204 is measured in the vertical direction via the pick-offs 210 and 212.

FIG. 2B provides an illustration of a Euler force generating arrangement 230. This Example is also illustrated with two proof masses 130-1 and 130-2. The proof masses include a first proof mass 130-1 and a second proof mass 130-1 with associated pick-offs 210 and 212. When the proof masses 130-1 and 130-2 are rotated about external rotation point 222, the first proof mass 130-1 moves in one direction and the second proof mass 130-2 moves in the other direction. As the system 102 and the body frame 133, that contains the poof masses 130-1 and 130-2 starts to rotate about rotation point 222, the proof masses 130-1 and 130-2 try and stay in the same place until the springs, or other tether, push them to keep up in the direction the device is moving. The pick-offs 210 and 212 measure the movement of the proof masses 130-1 and 130-2 in relation to the body frame 133 in the second axis 233 they are contained within to determine the Euler force in a rotational coordinate system. The Euler force 208 is proportional to the angular acceleration. As the device containing the proof masses 130-1 and 130-2 reach a constant speed, the proof masses 130-1 and 130-2 catch up with the rotational speed of the vehicle. When this happens, the springs that suspend the device come back to equilibrium and the displacement of the proof masses 130-1 and 130-1 relative to the device and go back to zero resulting in no Euler force 208 being measured. Both the Coriolis force 204 and the Euler force 208 may be measured simultaneously. One method of doing this is by using the same set of pick-offs 210 and 212 to measure both types of forces.

The rotation vectors 221 and 223 around to rotation points 220 and 222 define the direction about which rotation occurs and is perpendicular to an axis defined by the rotation points 220 and 222 in FIGS. 2A and 2B. This is just one example of rotation points that will lead to the measurement of Coriolis and Euler forces. A force sensor of embodiments containing the proof masses may be designed to measure both "in-plane" rotations and "out of plane rotations." For example, rotation as measured with the use of proof masses 130-1 and 130-2 could equally be measured where the proof masses move "in plane" of a silicon wafer (such as illustrated in FIGS. 2A and 2B where the pick-offs 210 and 212 measure in the plane) or measured "out-of-plane" where the pick-offs 210 and 212 are plates suspended above/below the proof masses 130-1 and 130-2. Further, the location of point of rotation, such as rotation point 220 in FIG. 2A, need not be centrally located to the proof masses in embodiments. Generally, pick-off sensors of embodiments will be able to measure both the Coriolis and Euler forces when the sensor is rotated about an axis in the center of the device or one which is 1 cm or even 1 meter away from the center of the device. However, in cases where the center of rotation is not near the center of the sensor, there may be large centripetal accelerations which could limit the sensor's performance.

Figure 3:
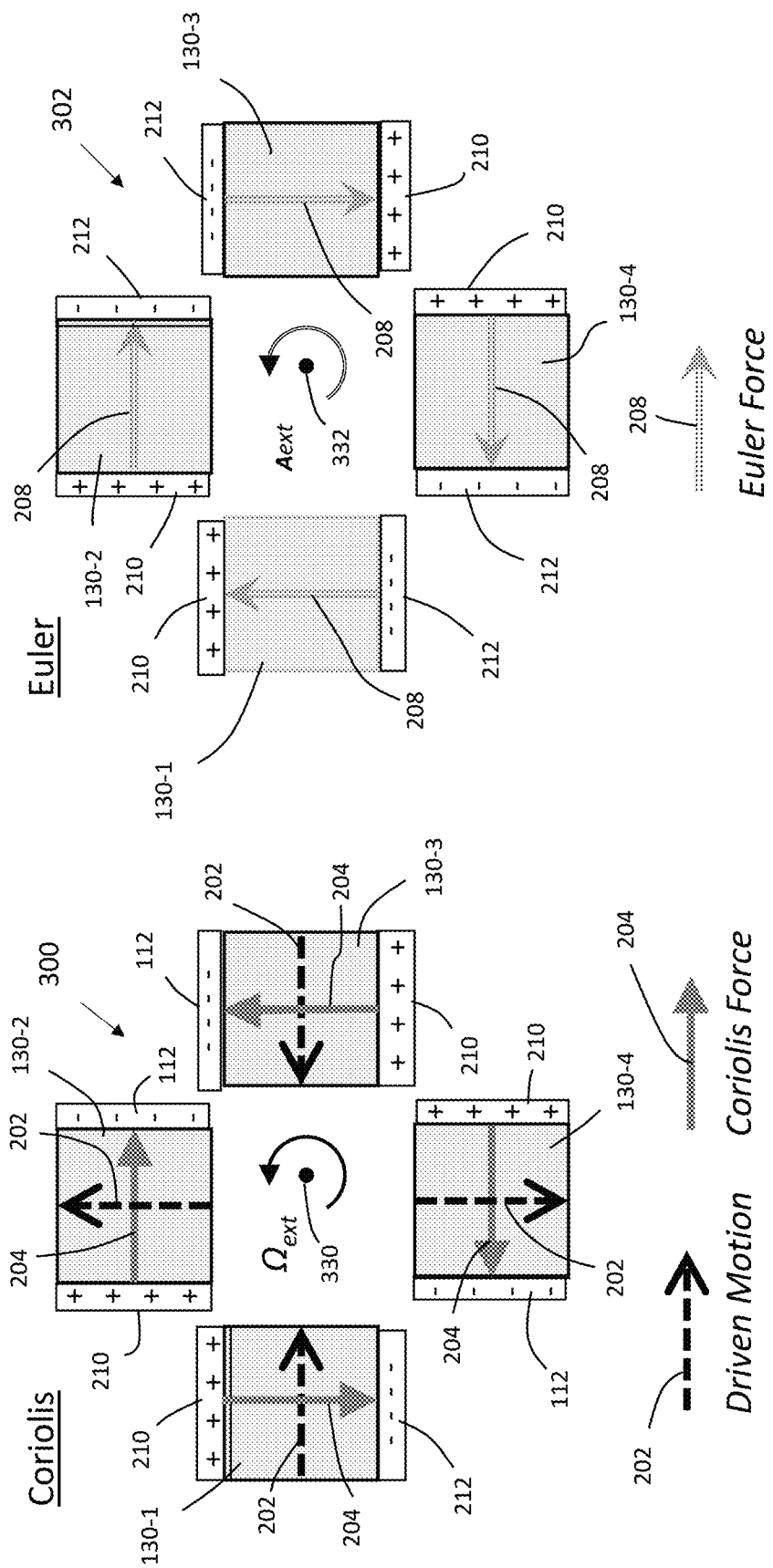
FIG. 3A illustrates an arrangement with four proof masses that generate Coriolis forces according to one exemplary embodiment.
FIG. 3B illustrates an arrangement with four proof masses that generate Euler forces according to one exemplary embodiment.

Another example embodiment of an arrangement of proof masses 130 and pick-offs 210 and 212 used to create Coriolis force 204 and Euler force 208 is provided in FIGS. 3A and 3B. In the example of FIGS. 3A and 3B, four proof masses are used to determine each of the Coriolis force 204 and the Euler force 208. This provides a more optimal system to measure the forces, however, there is a limitation to measuring Euler forces as discussed below. FIG. 3A provides a Coriolis force generating arrangement 300 that includes proof masses 130-1, 130-2, 130-3 and 130-4 and associated pick-offs 210 and 212. Coriolis force 204 are measured when the body frame 133 rotates about external rotation point 330. As discussed above, the Coriolis Force 204 is created by taking a cross product of a rotation rate and the driven motion 202. The Coriolis force is measured by associated pick-offs 210 and 212. As illustrated in FIG. 2A, when the body frame 133 rotates about the external rotation point 330, poof masses 130-1, 130-2, 130-3 and 130-4 generate a Coriolis force 204 in the plus polarity pick-off 210 direction. The placement of associated pairs of pick-offs (a plus polarity pick-off 210 and a 210 and a negative polarity pick-off 212), relative to their associated proof mass 130 is selected to have a desired outcome as discussed below.

FIG. 3B provides a Euler force generating arrangement 302 that also includes the four proof masses 130-1, 130-2, 130-2 and 130-4 and associated pick-offs 210 and 212. When the body frame 133 that contains the four proof masses 130-1, 130-2, 130-2 and 130-4 rotates about rotation point 332, Euler forces 208 are generated as illustrated in FIG. 3B that a measured by pick-offs 210 and 210. As illustrated in FIG. 3B, as the result of acceleration about the external rotation point 332, proof mass 130-1 and 130-3 generate Euler forces in the positive polarity direction with positive polarity pick-offs 210 while proof mass 130-2 and 130-4 generate Euler forces in the negative polarity with negative polarity pick-offs 212. Having an arrangement of proof masses that removes the Euler forces by cancelling out the force may be beneficiary in some types of devices that are only trying to only measure Coriolis forces. However, in embodiments that measure both the Coriolis force and Euler forces, the use of summing and difference amplifiers are used as illustrated in the Coriolis force and Euler force measuring system 400 of FIG. 4.

Figure 4:
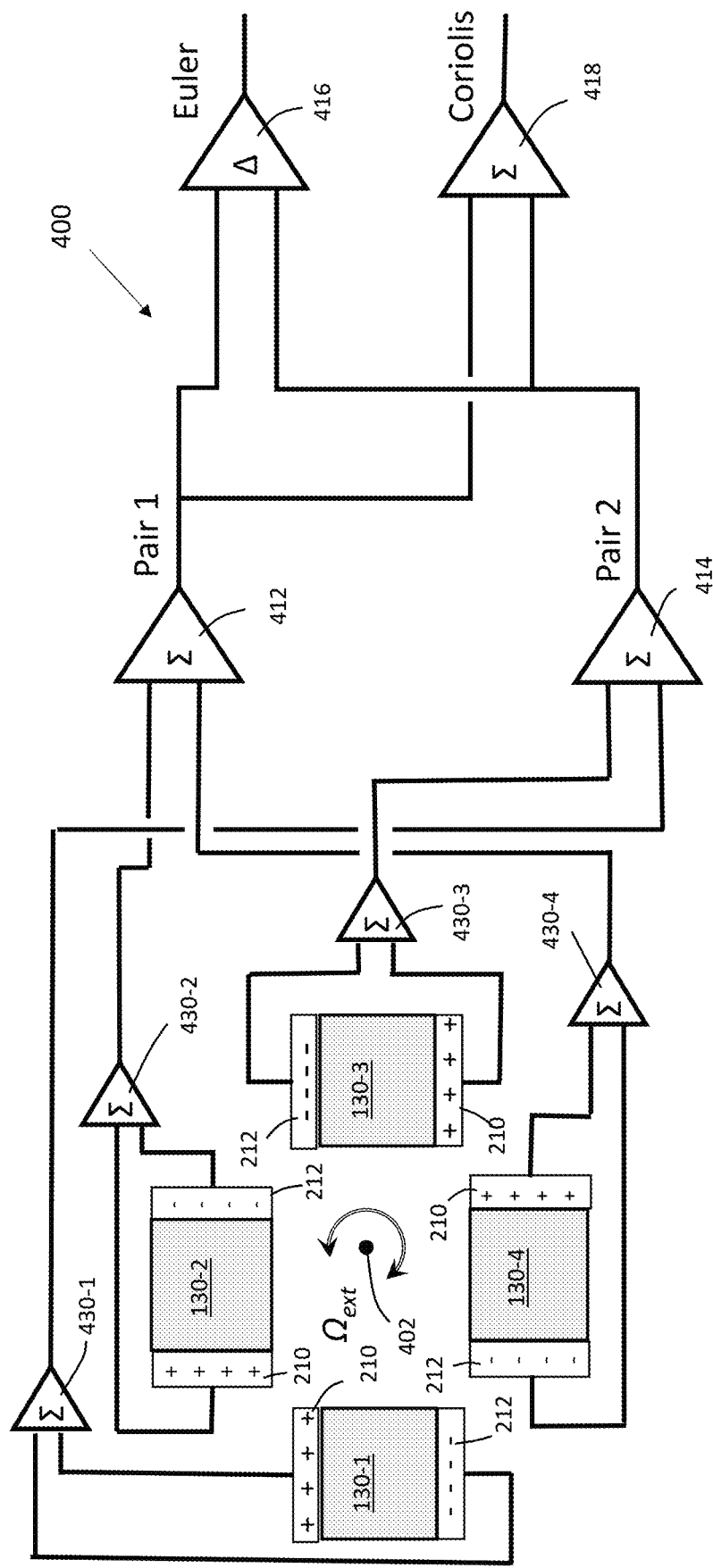
FIG. 4 illustrates a Coriolis force and Euler force measuring circuit with a four proof mass arrangement of one exemplary embodiment.

The Coriolis force and Euler force measuring system 400 embodiment of FIG. 4 addresses the issue with the Euler forces canceling out using four proof masses with the pick-off pair arrangement illustrated in FIG. 3B. In this example, four proof masses 130-1, 130-2, 130-3 and 130-4 are used to detect both the Coriolis force and the Euler force via positioned pick-offs 212 and 210. When a rotation about rotation point 402 occurs, Coriolis and Euler forces are generated. Each positive polarity pick-off 210 and each negative polarity pick-off 212 of each associated proof mass 130-1 through 130-4 is in communication with an associated summing amplifier 430-1 through 430-4 (or summer) in this configuration. In this configuration, an output of summer 430-1, associated with proof mass 130-1, and an output of summer 430-3, associated with proof mass 130-3 are communicated to inputs of summer 414. An output of summer 430-2, associated with proof mass 130-2, and an output of summer 430-4, associated with proof mass 130-4 are communicated to inputs of summer 412.

The summing amplifier 414 adds the inputs together. An output of the summing amplifier 414 is communicated to an input of differencing amplifier 416 and an input of summing amplifier 418. Summing amplifier 412 adds the inputs together and an output of the summing amplifier 412 is communicated to an input of differencing amplifier 416 and an input of summing amplifier 418. An output of differencing amplifier 416 is the Euler signal and an output of summing amplifier 418 is the Coriolis signal. Unlike the configuration illustrated in FIG. 3B where the Euler force 208 created by the proof masses 130-1 through 130-4 tend to cancel themselves out, the configuration illustrated in FIG. 4 provides a system to generate both the Coriolis and Euler forces using four proof masses with the positioning of the positive and negative pick-offs 210 and 212 pairs.

Figures 5A, 5B:
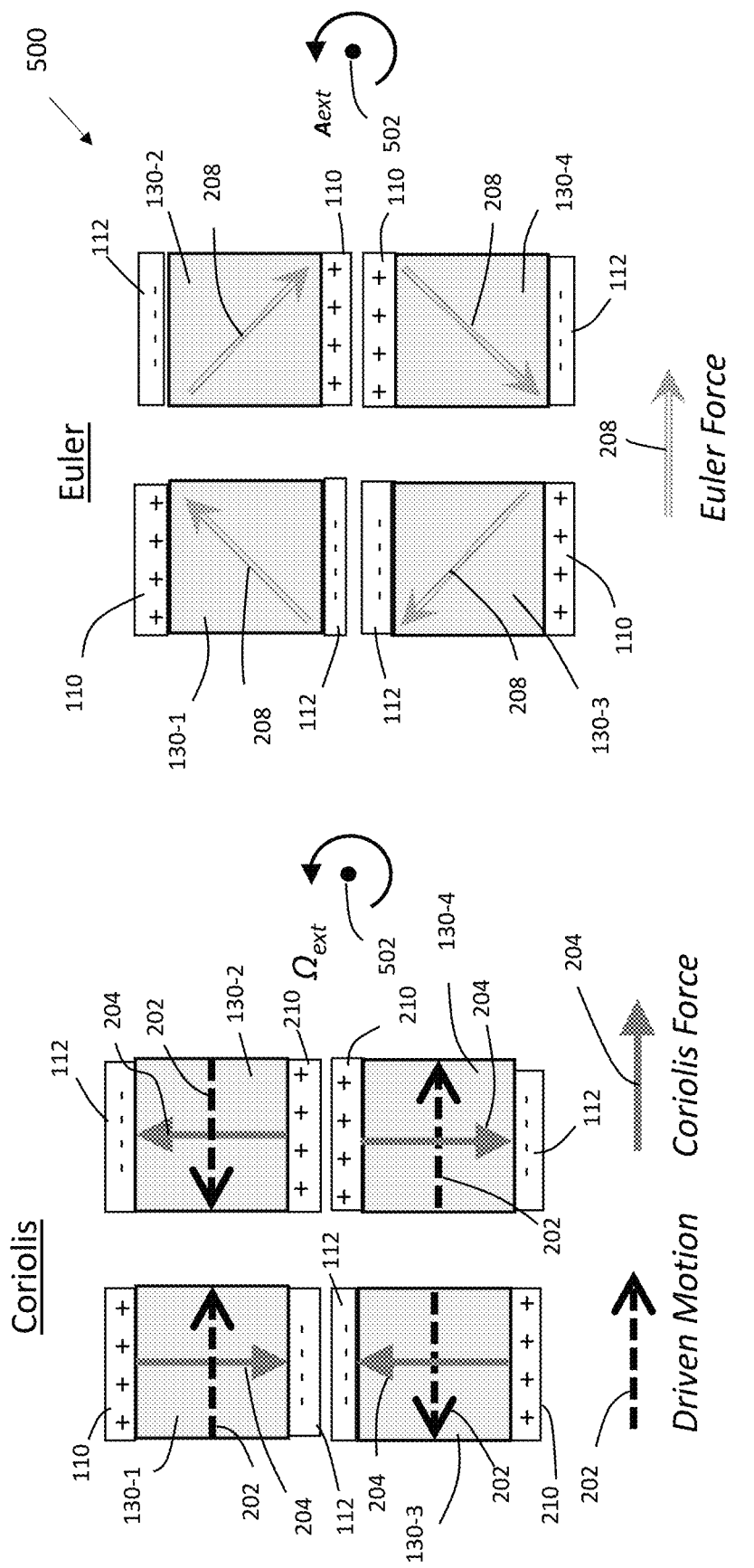
FIG. 5A illustrates an arrangement of four proof masses to generate Coriolis forces according to another exemplary embodiment.
FIG. 5B illustrates the arrangement of four proof masses of FIG. 5A to generate Euler forces Coriolis forces.

FIGS. 5A and 5B illustrates an alternative arrangement 500 of proof masses and pick-off pairs to generate Coriolis and Euler forces. In particular, FIG. 5A illustrates the generation of Coriolis forces with four proof masses 130-1 through 130-4 and FIG. 5B illustrates the generation of Euler forces with the proof masses 130-1 through 130-4. The four proof masses 130-1, 130-2, 130-3 and 103-4 measures Coriolis and Euler forces when the body frame 133 rotates about rotation point 502 that is not between the proof masses 103-1 through 130-4. A circuit of summing and differencing amplifiers as illustrated in FIG. 4 may be used to generate both the Coriolis and Euler signals.

Figure 6:
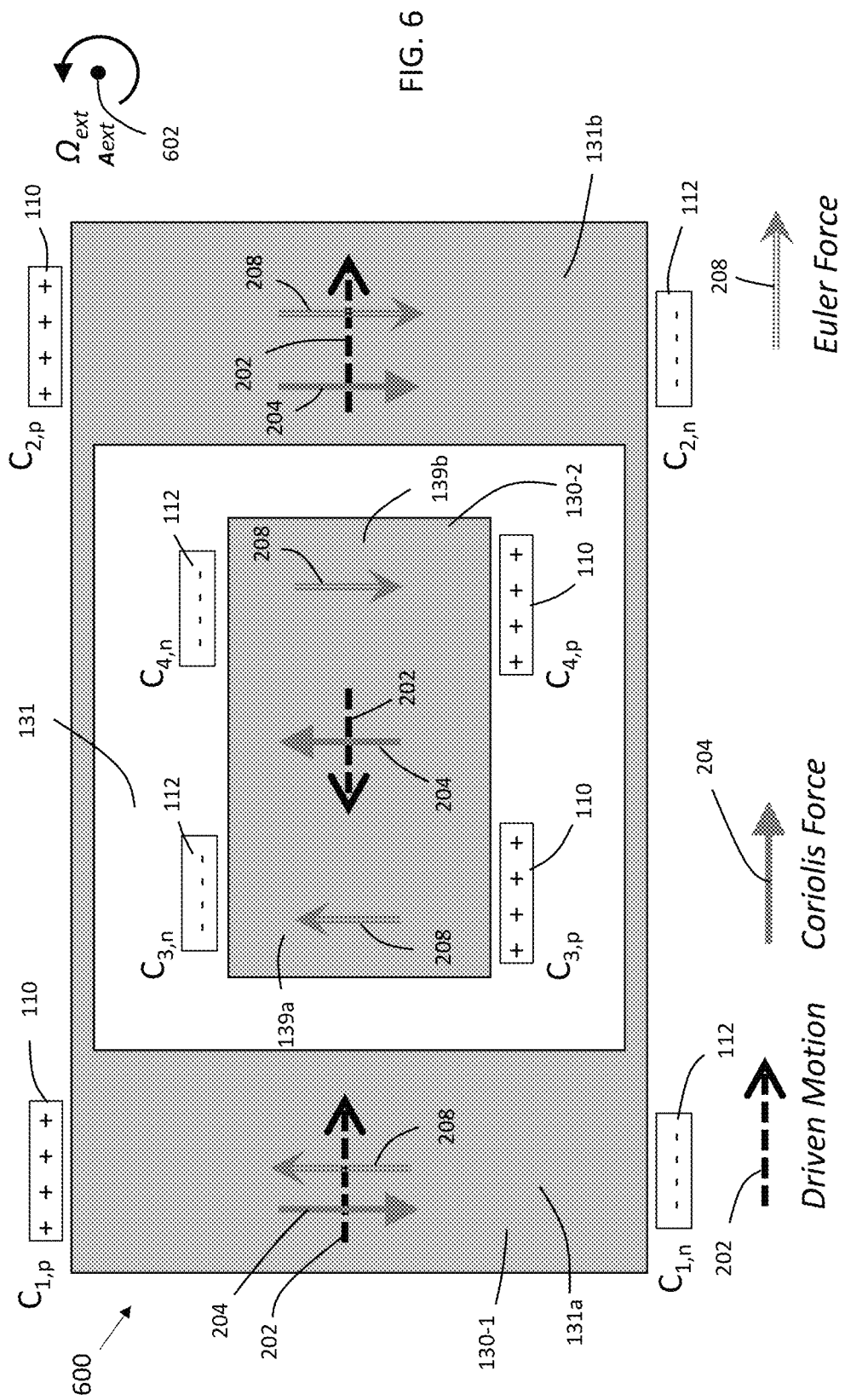
FIG. 6 illustrates an arrangement of two proof masses to generate Coriolis and Euler forces of yet another exemplary embodiment.

Another alternative Coriolis and Euler force sensing arrangement 600 that includes two-proof masses 130-1 and 130-2 is illustrated in FIG. 6. In this example, proof mass 130-2 is received within a central opening 131 of proof mass 130-1. Rotation of the device (or frame-of-reference) containing the Coriolis and Euler force arrangement 600 is about rotation point 602. As illustrated, the plus pick-offs 210 and the negative pick-offs 212 are selectively positioned to measure the Coriolis and Euler force. In particular, in this example, a first associated pair of pick-offs 210 and 212 are positioned to measure Coriolis force 204 and Euler force 208 of a first portion 131*a* of the proof mass 130-1 and a second associated pair of pick-offs 210 and 212 are positioned to measure Coriolis force 204 and Euler force 208 of a second portion 131*b* of proof mass 130-1. Further a third associated pair of pick-offs 210 and 212 are positioned to measure Coriolis force 204 and Euler force 208 of a first portion 139a of the proof mass 130-2 and a fourth associated pair of pick-offs 210 and 212 are positioned to measure Coriolis force 204 and Euler force 208 of a second portion 139b of proof mass 130-2.

Figure 8:
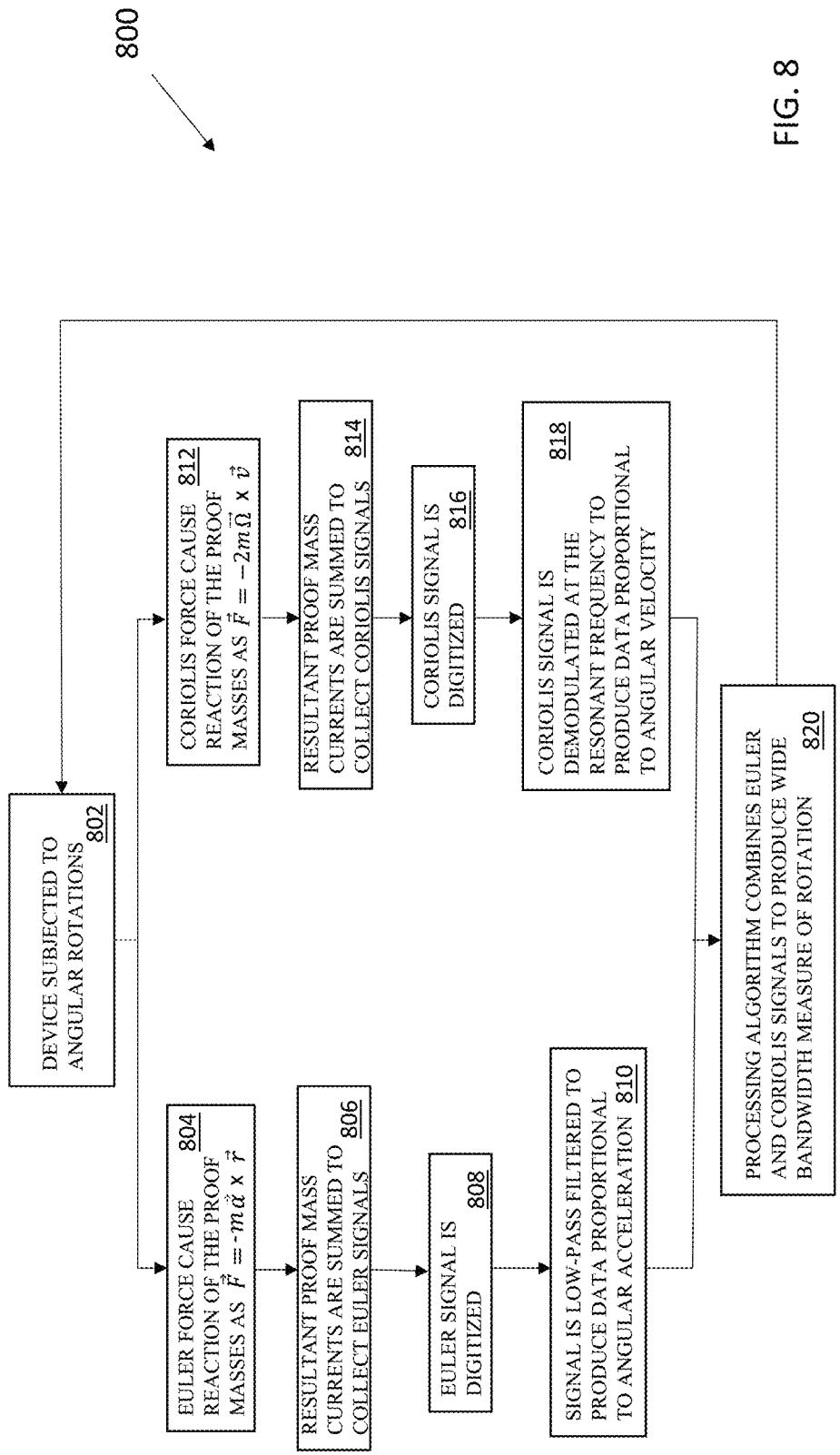
FIG. 8 illustrates rotation measurement flow diagram according to one exemplary embodiment.

FIG. 8 illustrates a rotation measurement flow diagram 800 of one example embodiment. The rotation measurement flow diagram 800 is provided as a sequence of blocks. The sequence of the blocks, however, may occur in another order or in parallel in other embodiments. Hence, embodiments are not limited to the sequence provided in FIG. 8.

The rotation measurement flow diagram 800 starts in this example when the device is subject to angular rotations at block (802). At block 804 a Euler force 208 causes a reaction or movement of one or more proof masses in relation to a frame-of-reference. At block 806 resultant proof mass currents are summed to collect Euler signals. The Euler signals are digitized at block 808. The signal is low-pass filtered to produce data proportional to angular acceleration at block 810.

At block 812 the Coriolis force causes a reaction or movement of one or more proof masses in relation to the frame-of-reference. At block 814 resultant proof mass currents are summed to collect Coriolis signals. The Coriolis signals are digitized at block 816. The Coriolis signal is demodulated at the resonant frequency to produce data proportional to angular velocity at block 818. The Euler and Coriolis signals are processed to produce wide bandwidth measure of rotation at block 820. Processing in one example may involve summing the two signals. More complex processing examples could use a Kalman filter or other more advanced algorithm which appropriately calibrates and weights each signal appropriately. The process continues at block 802.

Figure 9:
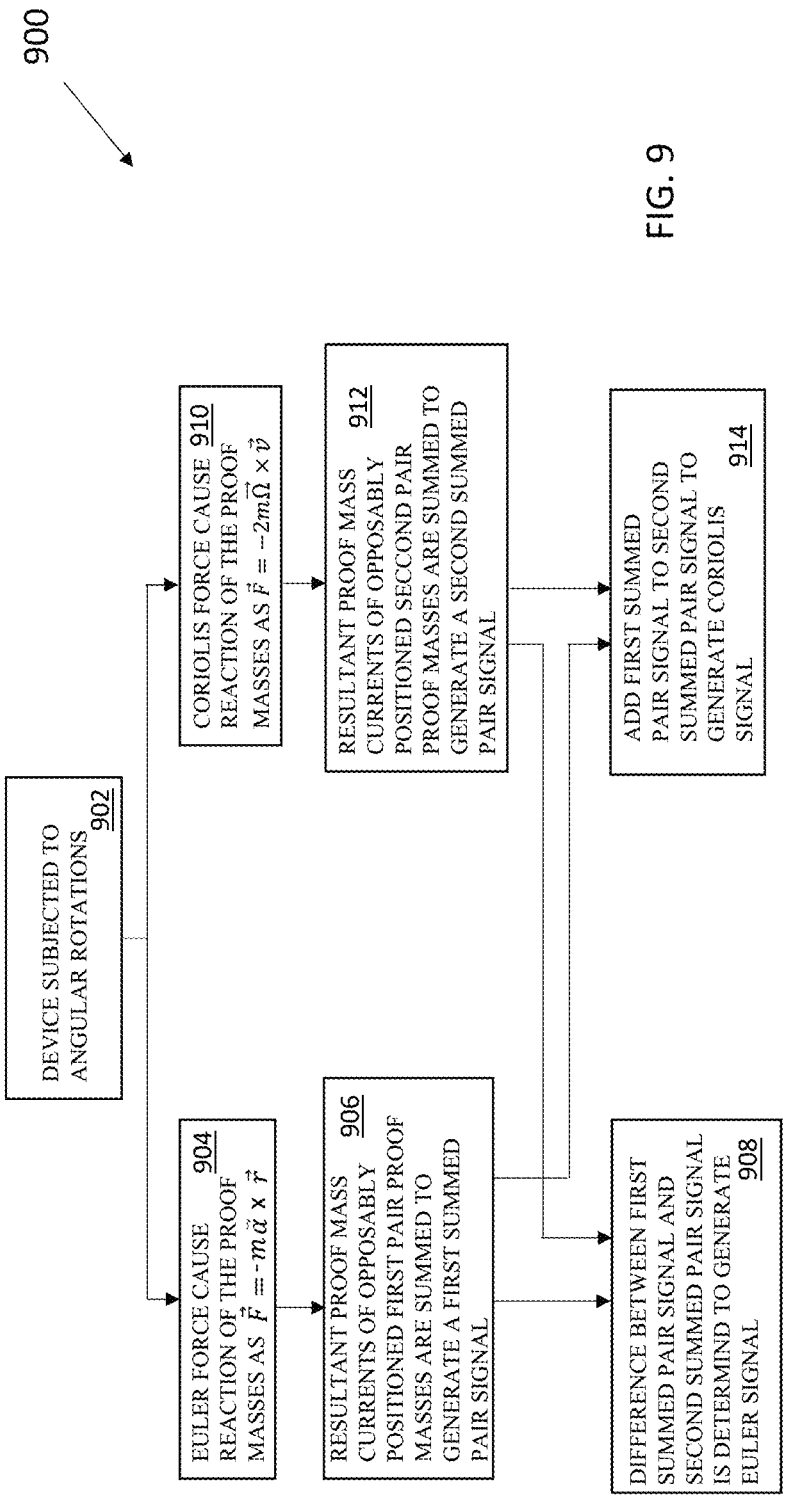
FIG. 9 illustrates a Coriolis force and Euler force generating flow diagram according to one exemplary embodiment.

FIG. 9 illustrates a Coriolis force and Euler force generating flow diagram 900 of another example embodiment. The Coriolis force and Euler force generating flow diagram 900 is provided as a sequence of blocks. The sequence of the blocks, however, may occur in another order or in parallel in other embodiments. Hence, embodiments are not limited to sequence provided in FIG. 9.

The Coriolis force and Euler force generating flow diagram 900 corresponds to the embodiment of the Coriolis force and Euler measuring system 400 of FIG. 4 described above. The process starts at block 902 where the device that contains the rotation measurement system 100 is subjected to angular rotations. At block 904 a Euler force 208 causes a reaction or movement of proof masses in relation to a frame-of-reference. At block 906 resultant proof mass currents of an opposably positioned pair of proof masses 130-2 and 130-4 are summed to generate a first summed pair signal. Where opposable positioned refers to the proof masses positioned on opposing sides of a rotation point 402 of the frame-of-reference in this example.

At block 910 the Coriolis force causes a reaction or movement of proof masses in relation to the frame-of-reference. At block 912 resultant proof mass currents of an opposably positioned pair of proof masses 130-1 and 130-3 are summed to generate a second summed pair signal.

A difference between the first summed pair signal and the second summed pair signals is used to determine the Euler signal at block 908 and the summing of the first summed pair signal and the second summed pair signals is used to determine the Coriolis signal at block 914.

EXAMPLE EMBODIMENTS

Example 1 is a rotation measurement system that includes at least two proof masses and at least one pick-off. Each proof mass is driven in a first axis of motion. The at least one pick-off is configured to measure movement of the at least two proof masses in a second axis when the system is rotated about a rotation point and generate Coriolis signals and Euler signals based on the measured movement of the at least two proof masses.

Example 2 includes the rotational measurement system of Example 1, further including a controller that is in communication to receive Coriolis data and Euler data from the Coriolis signals and the Euler signals. The controller is configured to process the received data to generate a rotation measurement.

Example 3 includes the rotation measurement system of any of the Examples 1-2, wherein the at least one pick-off further includes at least one pair of pick-offs for each proof mass of the at least two proof masses. Each proof mass being positioned between an associated pair of pick-offs. Each pair of pick-offs including a positive polarity pick-off and a negative polarity pick-off.

Example 4 includes the rotation measurement system of any of the Examples 1-3, further including, a first digitize circuit, a demodulation circuit, a second digitize circuit and a low pass filter. The first digitize circuit is configured to digitize the Coriolis signals. The demodulation circuit is configured to demodulate the digitized Coriolis signals at a resonant frequency to generate Coriolis data that is proportional to angular velocity. The second digitize circuit is configured to digitize the Euler signals. The low pass filter is configured to filter the digitized Euler signals to generate Euler data that is proportional to angular acceleration.

Example 5 includes the rotation measurement system of any of the Examples 1-4, wherein the at least two proof masses further includes a first proof mass, a second proof mass, a third proof mass and a fourth proof mass. The first, second, third and fourth proof masses are configured with pick-offs which sense the motions due to Coriolis and Euler forces when the system is rotated.

Example 6 includes the rotation measurement system of Example 5, wherein system further includes a pair of pick-offs for each proof mass of the first, second, third and fourth proof masses, a first summing amplifier, a second summing amplifier, a differencing amplifier and a third summing amplifier. Each of the first, second, third and fourth proof masses are positioned between an associated pair of pick-offs. Each pair of pick-offs include a positive polarity pick-off and a negative polarity pick-off. The negative polarity pick-off associated with the second proof mass being in communication with a first input of the first summing amplifier. The positive polarity pick-off associated with the fourth proof mass being in communication with a second input of the first summing amplifier. The negative polarity pick-off associated with the first proof mass being in communication with a first input of the second summing amplifier. The positive polarity pick-off associated with the third proof mass being in communication with a second input of the second summing amplifier. An output of the first summing amplifier being in communication with a first input of the differencing amplifier. An output of the second summing amplifier being in communication with a second input of the differencing amplifier, an output of the differencing amplifier being in communication with a controller. The output of the first summing amplifier being in communication with a first input of the third summing amplifier. The output of the second summing amplifier being in communication with a second input to the third summing amplifier. An output of the third summing amplifier being in communication with the controller.

Example 7 includes the rotation measurement system of Example 1, wherein the at least two proof masses further include a first proof mass including a central opening and a second proof mass positioned within the central opening of the first proof mass.

Example 8 includes the rotation measurement system of Example 2, further including, a memory to store at least operating instructions, the controller configured to execute the operating instructions stored in the memory.

Example 9 includes the rotation measurement system of Example 2, further including at least one of: an input/output in communication with the controller, the input/output including at least one of a communication link between a user and controller and components to manipulate control of vehicle the rotational measurement system is housed therein; and a motion control system in communication with the controller to receive the generated rotation measurement, the motion control system configured to control a motion of a body based at least in part on the received generated rotation measurement.

Example 10 includes the rotation measurement system of Example 2, further including a navigation system in communication with the controller to receive the generated rotation measurement, the navigation system configured to control navigation of the vehicle based at least in part on the received generated rotation measurement.

Example 11 includes a rotation measurement system that includes, a plurality of poof masses, at least one pair of pick-offs for each proof mass, a Coriolis and Euler force measuring system, a low pass filter, a demodulation circuit and a controller. Each pair of pick-offs are configured to measure movement of an associated proof mass due to Coriolis and Euler forces generated when a Coriolis and Euler force measuring system that includes the plurality of proof masses rotates about a rotation point, the Coriolis and Euler force measuring system configured to generate Coriolis signals and Euler signals based on measured movements of the plurality of proof masses. The low pass filter is configured to filter the Euler signals to generate Euler data that is proportional to angular acceleration. The demodulation circuit is configured to demodulate the Coriolis signals at a resonant frequency to generate Coriolis data that is proportional to angular velocity. The controller is in communication with the low pass filter and the demodulation circuit. The controller is configured to process the Euler data that is proportional to angular acceleration and the Coriolis data that is proportional to angular velocity to generate a rotation measurement.

Example 12 includes the rotation measurement system of Example 11, further including a first digitize circuit configured to digitize the Coriolis signals and a second digitize circuit configured to digitize Euler signals.

Example 13 includes the rotation measurement system of any of the Examples 11-12, wherein the plurality of proof masses further includes a first proof mass, a second proof mass, a third proof mass and a fourth proof mass. The first, second, third and fourth proof masses are configured with pick-offs which sense motions due to the Coriolis and Euler forces when the system is rotated.

Example 14 includes the rotation measurement system of any of the Examples 11-13, wherein the Coriolis and Euler force measuring system further includes a pair of pick-offs for each proof mass of the first, second, third and fourth proof masses. Each of the first, second, third and fourth proof masses are positioned between an associated pair of pick-offs, each pair of pick-offs including a positive polarity pick-off and a negative polarity pick-off. The Coriolis and Euler force measuring system further includes a first summing amplifier, a second summing amplifier, a differencing amplifier and a third summing amplifier. The negative polarity pick-off associated with the second proof mass is in communication with a first input of the first summing amplifier. The positive polarity pick-off associated with the fourth proof mass is in communication with a second input of the first summing amplifier. The negative polarity pick-off associated with the first proof mass is in communication with a first input of the second summing amplifier. The positive polarity pick-off associated with the third proof mass is in communication with a second input of the second summing amplifier. An output of the first summing amplifier is in communication with a first input of the differencing amplifier. An output of the second summing amplifier is in communication with a second input of the differencing amplifier. An output of the differencing amplifier is in communication with the controller. The output of the first summing amplifier is in communication with a first input of the third summing amplifier. The output of the second summing amplifier is in communication with a second input to the third summing amplifier. The output of the third summing amplifier is in communication with the controller.

Example 15 includes the rotation measurement system of any of the Examples 11-14, further including at least one of an input/output, a motion control system and a navigation system. The input/output is in communication with the controller. The input/output includes at least one of a communication link between a user and controller and components to manipulate control of vehicle the rotational measurement system is housed therein. The motion control system is in communication with the controller to receive the generated angular rotation measurement. The motion control system is configured to control a motion of a body based at least in part on the received generated rotation measurement. The navigation system is in communication with the controller to receive the generated angular rotation measurement. The navigation system is configured to control navigation of the vehicle based at least in part on the received generated rotation measurement.

Example 16 includes a method for measuring rotation using Coriolis and Euler forces. The method includes measuring movement of a plurality of proof masses moving due to the Coriolis forces and Euler forces generated by rotation of a system that includes the plurality of proof masses with a pair of pick-offs associated with each proof mass; determining Euler signals and Coriolis signals based on the measured movement of the plurality of proof masses in relation to the measuring system including the plurality of proof masses; filtering the Euler signal with a low-pass filter to generate Euler data that is proportional to angular acceleration; demodulating the Coriolis signals at a resonant frequency to generate Coriolis data that is proportional to angular velocity; and processing the Euler data and the Coriolis data to determine a rotation measurement.

Example 17 includes the method of Example 16, further including, summing pick-off signals associated with movement of the plurality of proof masses due to the Euler force to generate the Euler signals; and summing pick-off signals associated with movement of the plurality of proof masses due to the Coriolis force to generate the Coriolis signals.

Example 18 includes the method of any of the Examples 16-17, further including, digitizing the Euler signals and the Coriolis signals.

Example 19 includes the method of any of the Examples 16-18, wherein the plurality of spaced proof masses includes a first proof mass, a second proof mass, a third proof mass and a fourth proof mass; the method further including summing first signals from a negative polarity pick-off associated with the second proof mass with second signals from a positive polarity pick-off associated with the fourth proof mass; summing third signals from a negative polarity pick-off associated with the first proof mass with fourth signals from a positive polarity pick-off associated with the third proof mass; differencing a first output of the summed first signals and second signals and a second output of the summed third signals and fourth signals to determine the Euler signals; and summing the first output of the summed first signals and second signals and the second output of the summed third signals and fourth signals to determine the Coriolis signals.

Example 20 includes the method of any of the Examples 16-19, further including at least one of controlling motion of a device based at least in part on the determined rotation measurement; and controlling navigation of a vehicle based at least in part on the determine rotation measurement.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A rotation measurement system comprising:
   at least two proof masses, each proof mass being driven in a first axis of motion; and
   at least one pick-off configured to measure movement of the at least two proof masses in a second axis when the system is rotated about a rotation point and generate Coriolis signals and Euler signals based on the measured movement of the at least two proof masses.

2. The rotation measurement system of claim 1, further comprising:
   a controller in communication to receive Coriolis data and Euler data from the Coriolis signals and the Euler signals, the controller configured to process the received data to generate a rotation measurement.

3. The rotation measurement system of claim 1, wherein the at least one pick-off further comprises:
   at least one pair of pick-offs for each proof mass of the at least two proof masses, each proof mass positioned between an associated pair of pick-offs, each pair of pick-offs including a positive polarity pick-off and a negative polarity pick-off.

4. The rotation measurement system of claim 1, further comprising:
   a first digitize circuit configured to digitize the Coriolis signals;
   a demodulation circuit configured to demodulate the digitized Coriolis signals at a resonant frequency to generate Coriolis data that is proportional to angular velocity;
   a second digitize circuit configured to digitize the Euler signals; and
   a low pass filter configured to filter the digitized Euler signals to generate Euler data that is proportional to angular acceleration.

5. The rotation measurement system of claim 1, wherein the at least two proof masses further comprising:
   a first proof mass;
   a second proof mass;
   a third proof mass; and
   a fourth proof mass, wherein the first, second, third and fourth proof masses are configured with pick-offs which sense the motions due to Coriolis and Euler forces when the system is rotated.

6. The rotation measurement system of claim 5, further comprising:
   a pair of pick-offs for each proof mass of the first, second, third and fourth proof masses, each of the first, second, third and fourth proof masses positioned between an associated pair of pick-offs, each pair of pick-offs including a positive polarity pick-off and a negative polarity pick-off;
   a first summing amplifier, the negative polarity pick-off associated with the second proof mass in communication with a first input of the first summing amplifier, the positive polarity pick-off associated with the fourth proof mass being in communication with a second input of the first summing amplifier;
   a second summing amplifier, the negative polarity pick-off associated with the first proof mass in communication with a first input of the second summing amplifier, the positive polarity pick-off associated with the third proof mass in communication with a second input of the second summing amplifier;
   a differencing amplifier, an output of the first summing amplifier in communication with a first input of the differencing amplifier, an output of the second summing amplifier in communication with a second input of the differencing amplifier, an output of the differencing amplifier being in communication with a controller; and
   a third summing amplifier, the output of the first summing amplifier in communication with a first input of the third summing amplifier, the output of the second summing amplifier in communication with a second input to the third summing amplifier, an output of the third summing amplifier in communication with the controller.

7. The rotation measurement system of claim 1, wherein the at least two proof masses further comprising:
   a first proof mass including a central opening; and
   a second proof mass positioned within the central opening of the first proof mass.

8. The rotation measurement system of claim 2, further comprising:
   a memory to store at least operating instructions, the controller configured to execute the operating instructions stored in the memory.

9. The rotation measurement system of claim 2, further including at least one of:
   an input/output in communication with the controller, the input/output including at least one of a communication link between a user and controller and components to manipulate control of vehicle the rotational measurement system is housed therein; and
   a motion control system in communication with the controller to receive the generated rotation measurement, the motion control system configured to control a motion of a body based at least in part on the received generated rotation measurement.

10. The rotation measurement system of claim 2, further comprising:
    a navigation system in communication with the controller to receive the generated rotation measurement, the navigation system configured to control navigation of a vehicle based at least in part on the received generated rotation measurement.

11. A rotation measurement system comprising:
a plurality of poof masses;
at least one pair of pick-offs for each proof mass, each pair of pick-offs configured to measure movement of an associated proof mass due to Coriolis and Euler forces generated when a Coriolis and Euler force measuring system that includes the plurality of proof masses rotates about a rotation point, the Coriolis and Euler force measuring system configured to generate Coriolis signals and Euler signals based on measured movements of the plurality of proof masses
a low pass filter configured to filter the Euler signals to generate Euler data that is proportional to angular acceleration;
a demodulation circuit configured to demodulate the Coriolis signals at a resonant frequency to generate Coriolis data that is proportional to angular velocity; and
a controller in communication with the low pass filter and the demodulation circuit, the controller configured to process the Euler data that is proportional to angular acceleration and the Coriolis data that is proportional to angular velocity to generate a rotation measurement.

12. The rotation measurement system of claim 11, further comprising:
a first digitize circuit configured to digitize the Coriolis signals; and
a second digitize circuit configured to digitize Euler signals.

13. The rotation measurement system of claim 11, wherein the plurality of proof masses further comprising:
a first proof mass;
a second proof mass;
a third proof mass; and
a fourth proof mass, wherein the first, second, third and fourth proof masses are configured with pick-offs which sense motions due to the Coriolis and Euler forces when the system is rotated.

14. The rotation measurement system of claim 13, wherein the Coriolis and Euler force measuring system further comprises:
a pair of pick-offs for each proof mass of the first, second, third and fourth proof masses, each of the first, second, third and fourth proof masses positioned between an associated pair of pick-offs, each pair of pick-offs including a positive polarity pick-off and a negative polarity pick-off;
a first summing amplifier, the negative polarity pick-off associated with the second proof mass in communication with a first input of the first summing amplifier, the positive polarity pick-off associated with the fourth proof mass in communication with a second input of the first summing amplifier;
a second summing amplifier, the negative polarity pick-off associated with the first proof mass in communication with a first input of the second summing amplifier, the positive polarity pick-off associated with the third proof mass in communication with a second input of the second summing amplifier;
a differencing amplifier, an output of the first summing amplifier in communication with a first input of the differencing amplifier, an output of the second summing amplifier in communication with a second input of the differencing amplifier, an output of the differencing amplifier being in communication with the controller; and
a third summing amplifier, the output of the first summing amplifier in communication with a first input of the third summing amplifier, the output of the second summing amplifier in communication with a second input to the third summing amplifier, an output of the third summing amplifier in communication with the controller.

15. The rotation measurement system of claim 11, further comprising at least one of:
an input/output in communication with the controller, the input/output including at least one of a communication link between a user and controller and components to manipulate control of vehicle the rotational measurement system is housed therein;
a motion control system in communication with the controller to receive the generated rotation measurement, the motion control system configured to control a motion of a body based at least in part on the received generated rotation measurement; and
a navigation system in communication with the controller to receive the generated angular rotation measurement, the navigation system configured to control navigation of the vehicle based at least in part on the received generated rotation measurement.

16. A method for measuring rotation using Coriolis and Euler forces, the method comprising:
measuring movement of a plurality of proof masses moving due to the Coriolis forces and Euler forces generated by rotation of a system that includes the plurality of proof masses with a pair of pick-offs associated with each proof mass;
determining Euler signals and Coriolis signals based on the measured movement of the plurality of proof masses in relation to the measuring system including the plurality of proof masses;
filtering the Euler signal with a low-pass filter to generate Euler data that is proportional to angular acceleration;
demodulating the Coriolis signals at a resonant frequency to generate Coriolis data that is proportional to angular velocity; and
processing the Euler data and the Coriolis data to determine a rotation measurement.

17. The method of claim 16, further comprising:
summing pick-off signals associated with movement of the plurality of proof masses due to the Euler force to generate the Euler signals; and
summing pick-off signals associated with movement of the plurality of proof masses due to the Coriolis force to generate the Coriolis signals.

18. The method of claim 16, further comprising:
digitizing the Euler signals and the Coriolis signals.

19. The method of claim 16, wherein the plurality of proof masses includes a first proof mass, a second proof mass, a third proof mass and a fourth proof mass; the method further comprising:
summing first signals from a negative polarity pick-off associated with the second proof mass with second signals from a positive polarity pick-off associated with the fourth proof mass;
summing third signals from a negative polarity pick-off associated with the first proof mass with fourth signals from a positive polarity pick-off associated with the third proof mass;

differencing a first output of the summed first signals and second signals and a second output of the summed third signals and fourth signals to determine the Euler signals; and summing the first output of the summed first signals and second signals and the second output of the summed third signals and fourth signals to determine the Coriolis signals.

20. The method of claim 16, further comprising at least one of:

controlling motion of a device based at least in part on the determined rotation measurement; and controlling navigation of a vehicle based at least in part on the determine rotation measurement.

\* \* \* \* \*